United States Patent [19]

Young

[11] Patent Number: 4,949,674
[45] Date of Patent: Aug. 21, 1990

[54] AUTOMATIC FISHFOOD DISPENSER

[76] Inventor: Richard Young, 5 Fl., No. 7, Lane 389, Lien Cheng Rd., Chung Ho City, Taipei Hsien, Taiwan

[21] Appl. No.: 451,424

[22] Filed: Dec. 15, 1989

[51] Int. Cl.⁵ ............................................. A01K 61/02
[52] U.S. Cl. ............................... 119/51.04; 119/51.11; 222/643; 222/650
[58] Field of Search ................. 119/51.04, 51.11, 56.2, 119/56.1; 222/650, 643

[56] References Cited

U.S. PATENT DOCUMENTS

| | | | |
|---|---|---|---|
| 2,772,659 | 12/1956 | Tennis | 119/51.04 |
| 3,022,767 | 2/1962 | Malek | 119/51.04 |
| 3,031,109 | 4/1962 | Krag | 119/51.11 |
| 3,150,798 | 9/1969 | Sutton | 222/650 |
| 4,089,299 | 5/1978 | Suchowski | 119/51.04 |
| 4,437,595 | 3/1984 | Stevens et al. | 119/51.11 |
| 4,491,086 | 1/1985 | Croteau | 119/51.11 |
| 4,665,862 | 5/1927 | Pitchford, Jr. | 119/51.11 |

*Primary Examiner*—Paul J. Hirsch
*Attorney, Agent, or Firm*—Bernard R. Gans

[57] ABSTRACT

An automatic fishfood dispenser includes a food container, a dispensing mechanism, and a battery pack. A transparent plastic food container is provided with a removable cover and is integrally formed with a channel through which an outflow of fishfood is communicated to an egress provided in said dispensing mechanism. A grooved spindle positioned in the channel when stationary blocks a flow of fishfood from the channel, but when rotating distributes a quantity of fishfood to the egress. A battery powered motor operating in conjunction with a timer controls the rotation of the grooved spindle. A quantity of fishfood to be dispensed and a time interval preset by the user by means of the timer allows for the automatic dispensing of a quantity of fishfood at predetermined time intervals.

1 Claim, 3 Drawing Sheets

AUTOMATIC FISHFOOD DISPENSER

BACKGROUND OF THE INVENTION

This invention relates to a fishfood dispenser, and more particularly, to a fishfood dispenser which automatically dispenses a predetermined quantity of fishfood at set time intervals.

Fish are common household pets which require regular feeding. However, unlike cats and dogs, fish have no means for indicating to an owner that feeding time has arrived. Furthermore because when subject to overfeeding they die, fish require a well regulated feeding schedule. Therefore, a fishfood dispenser should automatically dispense a predetermined quantity of food at set time intervals.

SUMMARY OF THE INVENTION

Accordingly, a primary object of the present invention is to provide a dispenser for apportioning a predetermined quantity of fishfood.

An additional object of the present invention is to provide a dispenser with a timer for apportioning fishfood at set time intervals.

Another object of the present invention is to provide a battery operated automatic fishfood dispenser.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
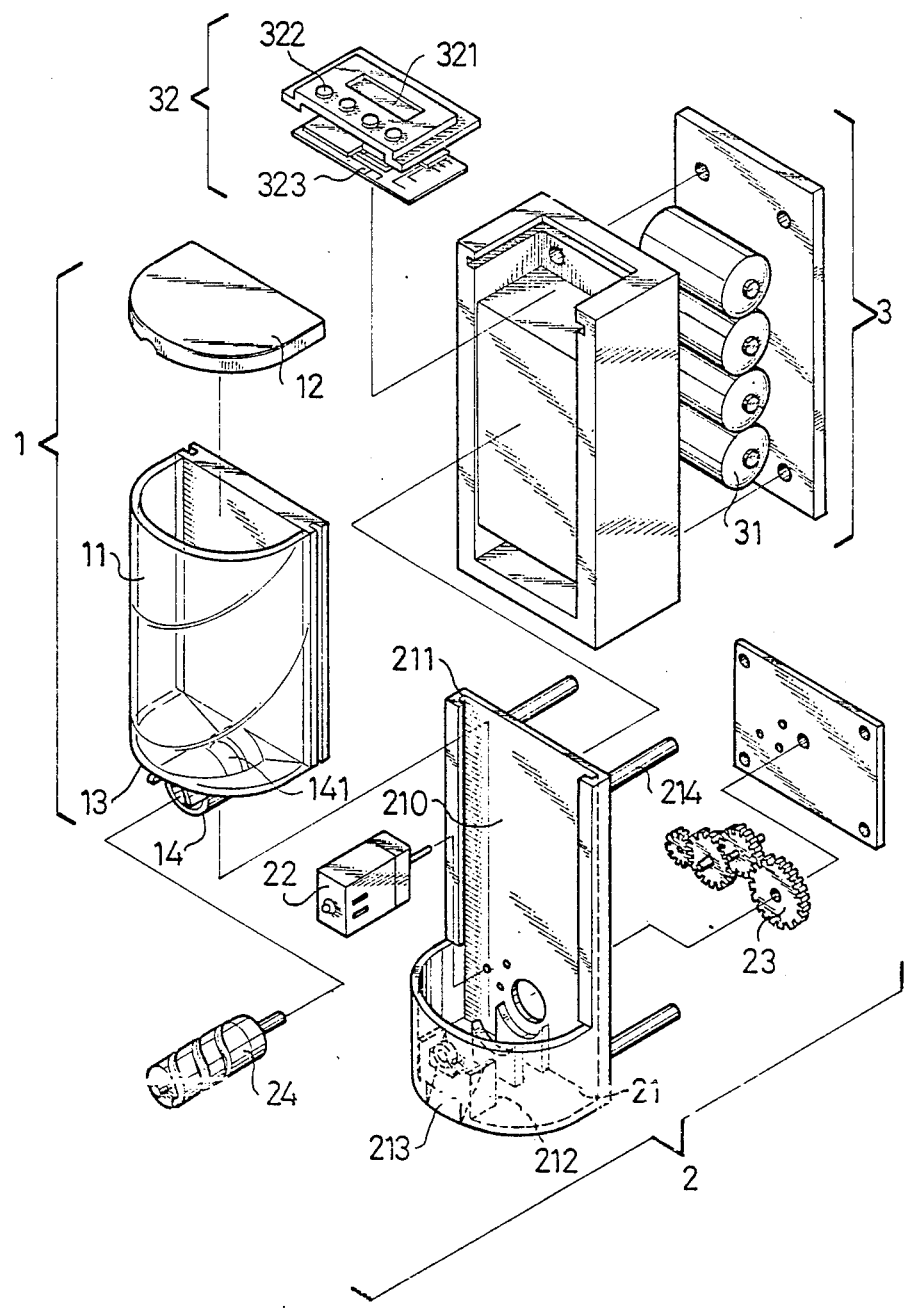
FIG. 1 is an exploded view of an automatic fishfood dispenser in accordance with the present invention.

With reference to the drawings, and initially to FIG. 1, it can be seen that an automatic fishfood dispenser in accordance with the present invention comprises a food container 1, a dispensing mechanism 2, and a timer regulated battery power supply 3.

The food container 1 is provided in the form of a transparent plastic semi-cylindrical container 11 with a base 13 and a removable cover 12. The base 13 is integrally formed with a channel 14 for allowing a regulated outflow of fishfood therethrough.

The dispensing mechanism 2 is provided for regulating such an outlet of fishfood and is thus shaped to mate with the food container 1. The dispensing mechanism 2 therefore includes a seat 21, provided in the same semi-cylindrical shape as the transparent food container 11. The seat 21 is integrally formed with a straight back 210 which is provided on each side thereof with slotted grooves 211 for accepting the food container 1. Thus, the food container 1 slidably connects with the back 210 of the seat 21 by means of the grooves 211 such that the food container 1 is fixably seated on the seat 21.

The seat 21 is provided on a lower portion thereof with an egress 213 for allowing an outflow of fishfood to the fish tank. An outflow of fishfood from the food container 1 via an outlet 141 through the channel 14 is communicated to the egress 213 by means of a chute 212. The chute 212 is provided in the seat 21 and corresponds with the channel 14 such that fish food dispensed by the food container 11 through the channel 14 exits the dispenser through the egress 213 via the chute 212.

A spindle 24, provided in the channel 14 for regulating an outflow of fishfood from the food container 1, is threaded with a plurality of grooves 214, such that, when rotated, the spindle 24 distributes a quantity of fishfood to the chute 212 via the grooves 214. When stationary, however, the spindle 24 blocks an outflow of fishfood to the chute 212.

Figure 2:
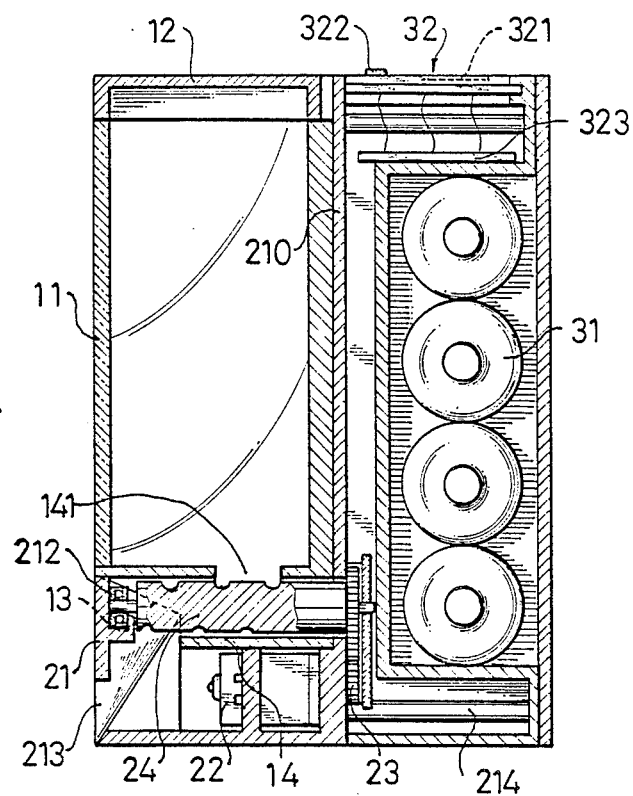
FIG. 2 is a sectional side view of FIG. 1.

The spindle 24 is rotated by means of a battery powered motor 22 operating in conjunction with a set of gears 23. The battery powered motor is also disposed in the seat 21 beside the chute 212, while the gears are disposed on the outer face of the back 210 directly behind the spindle 24 as shown in FIG. 2.

The motor 2 is powered by four batteries 31 housed in the battery pack 3. The battery pack 3 attaches to the outer face of the back 210 of the dispensing mechanism 2 providing a compact and efficient as well as aesthetically pleasing design as shown in FIG. 2.

The motor 2 is user operated by a timer 32 disposed in the battery back 3 above the batteries 31. The timer includes an LED display 321 and a plurality of push buttons 322 which operate in conjuction with a circuit board 323 to control operation of the motor 22. A user inputs to the timer 32 a set time interval for the dispensing of fishfood and a quantity of food to be dispensed. The timer 32 then, by utilizing circuitry of well-known design, translates this information to the batteries which at particular time intervals power the motor 22, which, in turn, rotates the spindle 24 to allow a predetermined quantity of fishfood to be dispensed to the fishtank.

Figure 3:
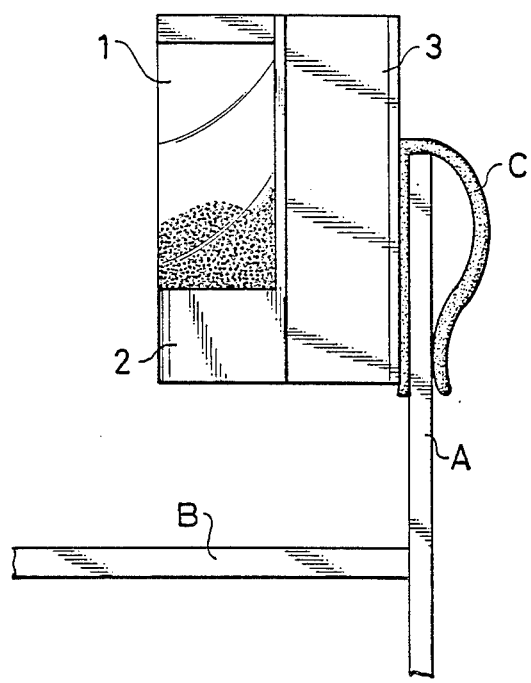
FIG. 3 is a side view of an automatic fishfood dispenser in accordance with the present invention attached to a fish tank.

FIG. 3 illustrates the automatic fishfood dispenser clipped to the side of a fish tank A above the water level by means of a clip 4 provided on the back of the battery pack 3. FIG. 4 illustrates the automatic fishfood dispenser by means of a clip 4 provided on a bottom surface thereof clipped to a divider B above the water level. The automatic fishfood dispenser can therefore be conveniently attached to the fishtank.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. An automatic fishfood dispenser comprises
a food container, integrally formed with a channel on a base thereof for communicating an outflow of fishfood therethrough, including a removable cover;
a dispensing mechanism provided with a seat on which said food container is disposed, said seat integrally formed with a straight back provided with slotted grooves on each side thereof by means of which said food container is slidably connectable with said dispensing mechanism, said seat being provided on a lower portion thereof with an egress for allowing an outflow of fishfood to a fishtank, an outflow of fishfood from said food container through said channel communicated to said egress via a chute, a spindle threaded with a plurality of grooves positioned in said channel for regulating an outflow of fishfood to said chute, such that, when rotating, said spindle distributes a quantity of fishfood to said chute by means of said grooves, but, when stationary, said spindle blocks an outflow of fishfood through said channel to said chute, said spindle being rotated by a battery powered motor, also disposed in said seat, operating in conjunction with a set of gears which are disposed on an exterior surface of said seat; and, a battery pack housing a plurality of batteries for operating said battery powered motor, further comprising a timer by means of which a user communicated a set quantity of fishfood to be dispensed by said automatic fishfood dispenser through a rotation of said spindle and a set time interval at which said battery operated motor activates said spindle.

* * * * *